United States Patent
Sanzgiri et al.

(10) Patent No.: US 7,616,613 B2
(45) Date of Patent: Nov. 10, 2009

(54) INTERNET PROTOCOL AUTHENTICATION IN LAYER-3 MULTIPOINT TUNNELING FOR WIRELESS ACCESS POINTS

(75) Inventors: Ajit Sanzgiri, Los Gatos, CA (US); Douglas Gourlay, Sausalito, CA (US)

(73) Assignee: Cisco Technology, Inc., San Jose, CA (US)

(*) Notice: Subject to any disclaimer, the term of this patent is extended or adjusted under 35 U.S.C. 154(b) by 726 days.

(21) Appl. No.: 10/992,943

(22) Filed: Nov. 19, 2004

(65) Prior Publication Data

US 2005/0270992 A1   Dec. 8, 2005

Related U.S. Application Data

(60) Provisional application No. 60/568,568, filed on May 5, 2004.

(51) Int. Cl.
*H04W 4/00* (2009.01)

(52) U.S. Cl. .................................................. 370/338

(58) Field of Classification Search ........................ None
See application file for complete search history.

(56) References Cited

U.S. PATENT DOCUMENTS

| | | | |
|---|---|---|---|
| 5,473,599 A | 12/1995 | Li et al. | |
| 5,835,696 A | 11/1998 | Hess | |
| 6,701,361 B1 * | 3/2004 | Meier | 709/224 |
| 7,010,715 B2 | 3/2006 | Barbas et al. | |
| 7,093,160 B2 | 8/2006 | Lau et al. | |
| 7,136,383 B1 | 11/2006 | Wilson | |
| 7,411,925 B2 * | 8/2008 | Nain et al. | 370/329 |
| 7,471,656 B2 * | 12/2008 | Karoubalis et al. | 370/331 |
| 7,539,164 B2 * | 5/2009 | Maenpaa et al. | 370/331 |
| 7,548,526 B2 * | 6/2009 | Oba et al. | 370/331 |
| 2002/0057657 A1 * | 5/2002 | La Porta et al. | 370/331 |
| 2002/0136210 A1 * | 9/2002 | Boden et al. | 370/389 |
| 2002/0167896 A1 * | 11/2002 | Puntambekar | 370/216 |
| 2004/0013130 A1 * | 1/2004 | Blanchet et al. | 370/466 |
| 2004/0073642 A1 | 4/2004 | Iyer | |
| 2004/0114558 A1 * | 6/2004 | Krishnamurthi et al. | 370/338 |
| 2004/0176023 A1 * | 9/2004 | Linder et al. | 455/3.01 |
| 2005/0129019 A1 * | 6/2005 | Cheriton | 370/392 |
| 2005/0163079 A1 * | 7/2005 | Taniuchi et al. | 370/331 |

(Continued)

OTHER PUBLICATIONS

Sullenberger, Mike, entitled "Dynamic Multipoint IPsec VPNs (Using Multipoint GRE/NHRP to Scale IPsec VPNs)" Cisco Systems, Inc. 1992-2003.

(Continued)

*Primary Examiner*—Ayaz R Sheikh
*Assistant Examiner*—Timothy J Weidner
(74) *Attorney, Agent, or Firm*—Trellis IP Law Group, PC

(57) ABSTRACT

Enhanced tunnel communication mode creation, management and tuning in a network that includes wireless access points (APs) and user authentication. Tunnels can be dynamically managed to adapt to the changing topology of a network with APs. User devices such as mobile phones, laptop computers, personal digital assistants, or other devices can be added or dropped from an assigned AP. APs, routers, switches or other devices can also be added, removed, or modified in their network characteristics. Special control is also provided for IP multicast, Dynamic Host Configuration Protocol (DHCP), Address Resolution Protocol (ARP) and other network features.

34 Claims, 3 Drawing Sheets

U.S. PATENT DOCUMENTS

2006/0002343 A1    1/2006  D Agosta
2006/0146837 A1*   7/2006  Atsuki et al. ................ 370/400
2007/0171870 A1*   7/2007  Oba et al. .................... 370/331
2008/0229095 A1*   9/2008  Kalimuthu et al. .......... 713/153

OTHER PUBLICATIONS

Cisco Systems, Inc., "Cisco Nonstop Forwarding and Timer Manipulation for Fast Convergence" Copyright 1991-2003, 13 pages.

* cited by examiner

INTERNET PROTOCOL AUTHENTICATION IN LAYER-3 MULTIPOINT TUNNELING FOR WIRELESS ACCESS POINTS

CLAIM OF PRIORITY

This invention claims priority from U.S. Provisional Patent application Ser. No. 60/568,568 filed on May 5, 2004 which is hereby incorporated by reference as if set forth in full in this application.

BACKGROUND OF THE INVENTION

This invention is related in general to digital networks and more specifically to the use of Internet Protocol (IP) authentication information in layer-3 (L3) multipoint tunneling in a system using wireless access points.

Digital networks have become an invaluable resource for many types of communication and data transfers. The growing popularity of wireless networks is presenting new challenges in the design of fast, efficient networks. Although users are provided the ability to "roam" about increasingly larger areas, such mobility can also impact network security, speed, reliability and other concerns.

Mobile nodes (MNs), such as cell phones, laptops, personal digital assistants (PDAs), and other devices can move in and out of wireless range of various stationary access points (APs). Access points, such as a wireless router or switch, while largely stationary may also be taken from, or put onto, the network from time-to-time. The MNs and APs register with a wireless domain services (WDS) process that keeps track of their attributes and locations for purposes of authenticating, routing, and other network services. The WDS data is used by a data path control to establish a data path between MNs and a route device (e.g. a central switch (CS)) for centralized data forwarding.

One concern of mobile network connectivity and switching is to provide continuous services and data flow when an attribute of an MN or AP changes, such as when an MN moves from one AP area to another, or when an MN or AP attribute is updated. In such cases it may take a few hundred milliseconds, or even seconds for the MN location information to be updated and propagated to the data path control, CS and other components of the system. In some cases the MN may need to re-authenticate to a remote authentication server (AS). Additional delays may be encountered before communications to the MN and/or AP can be continued, such as using address resolution protocol (ARP) to update forwarding tables.

SUMMARY OF EMBODIMENTS OF THE INVENTION

Embodiments of the present invention provide a multipoint tunneling communication mode to allow proxy routing from a route device to MNs via APs. Tunnels can be dynamically managed to adapt to the changing topology of a network with wireless access points (APs). Mobile devices can be added to, or dropped from, an assigned AP. APs, routers, switches or other devices (i.e., "hosts") can also be added, removed, or modified in their network characteristics.

In order to combine the benefits of tunneled communications with other known network properties, such as IP authentication, multicast, etc., at a network L3 layer where roaming is provided, embodiments of the invention include creation, management and tuning of tunnels and half-tunnels. Special control is also provided for IP multicast, Dynamic Host Configuration Protocol (DHCP), ARP and other network features.

In one embodiment the invention provides a method for transferring information in a digital network, wherein the network includes a router, an access point, a user device, and a plurality of other devices all coupled to the network, the method comprising creating a multipoint tunnel communication mode to transfer information from the user device to at least one of the other devices; using a routing configuration to route communications over the multipoint tunnel; and modifying the routing configuration in response to a discovered host.

In another embodiment the invention provides an apparatus for transferring information in a digital network, wherein the network includes a router, an access point, a user device, and a plurality of other devices all coupled to the network, the apparatus comprising means for creating a multipoint tunnel communication mode to transfer information from the user device to at least one of the other devices; means for using a routing configuration to route communications over the multipoint tunnel; and means for modifying the routing configuration in response to a discovered host.

In another embodiment the invention provides an apparatus for transferring information in a digital network, wherein the network includes a router, an access point, a user device, and a plurality of other devices all coupled to the network, the apparatus comprising a processor for executing instructions; a machine-readable medium including one or more instructions for creating a multipoint tunnel communication mode to transfer information from the user device to at least one of the other devices; one or more instructions for using a routing configuration to route communications over the multipoint tunnel; and one or more instructions for modifying the routing configuration in response to a discovered host.

In another embodiment the invention provides a machine-readable medium including instructions for transferring information in a digital network, wherein the network includes a router, an access point, a user device, and a plurality of other devices all coupled to the network, the machine-readable medium comprising one or more instructions for creating a multipoint tunnel communication mode to transfer information from the user device to at least one of the other devices; one or more instructions for using a routing configuration to route communications over the multipoint tunnel; and one or more instructions for modifying the routing configuration in response to a discovered host.

DETAILED DESCRIPTION OF EMBODIMENTS OF THE INVENTION

Figure 1:
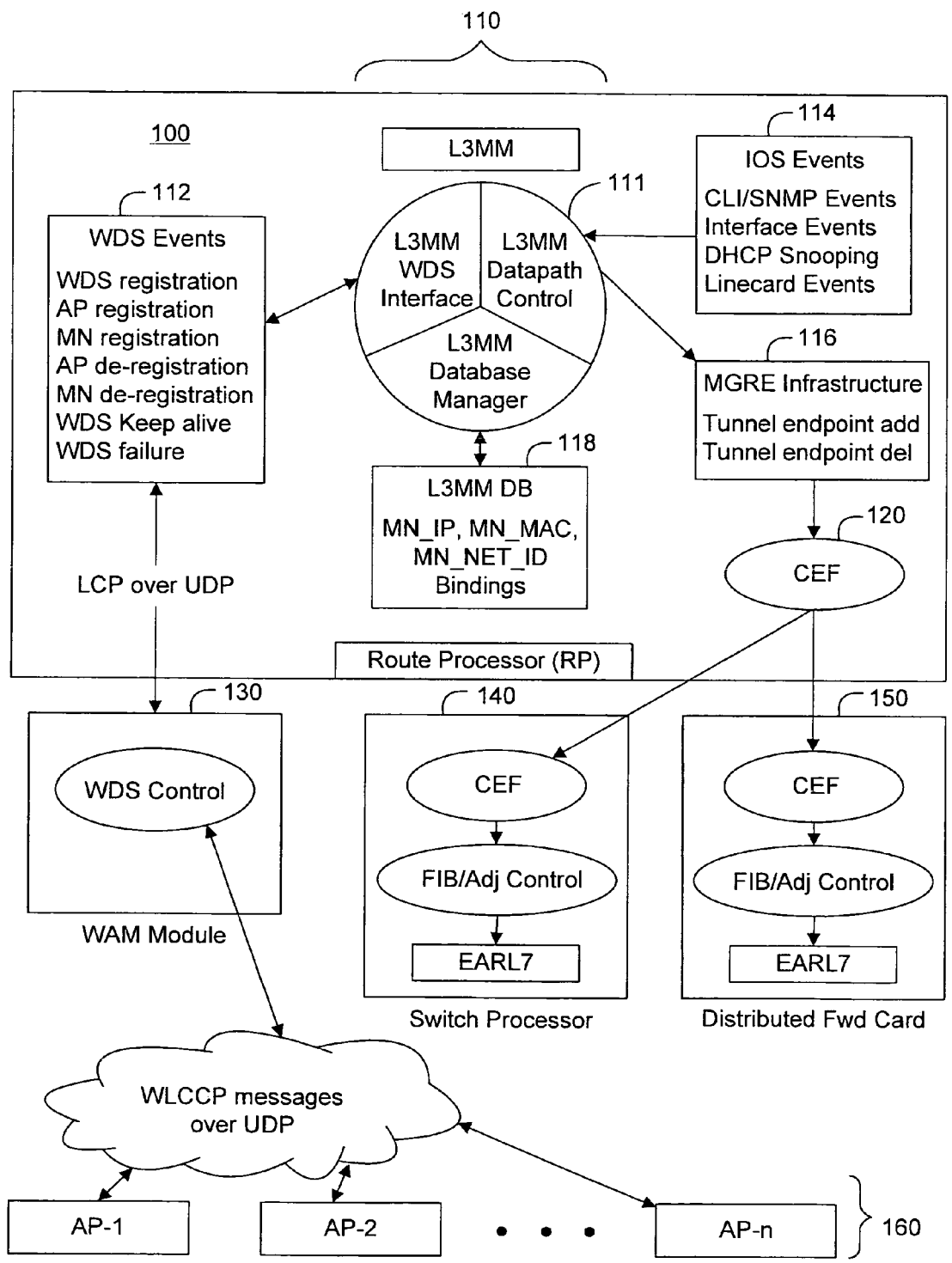
FIG. 1 shows an overview of network components suitable for use with embodiments of the invention.

FIG. 1 provides a general overview of network components suitable for use with embodiments of the invention. Note that other combinations of hardware and software can be used that vary from those of FIG. 1.

In a preferred embodiment, route device 100 is incorporated into a product manufactured by Cisco Systems, Inc., and referred to as the Catalyst™ series of route processors. Other embodiments can include features of the invention in other devices or in different types of devices. In the route device, datapath control functions are performed by a process referred to as the Layer 3 Mobility Manager (L3MM). Functions of the L3MM are illustrated at 111 and 118. The L3MM is used to maintain multi-point Generic Routing Encapsulation (mGRE) between route device 100 and APs at 160. The L3MM is also used to handle address bindings as illustrated at 118, to send machine address code (MAC) addresses for proxy ARP and to perform other functions.

In FIG. 1, APs 1-n at 160 are in communication with MNs (not shown). The control traffic containing device discovery information from the APs is sent via Wireless LAN Context Control Protocol (WLCCP) over Uniform Datagram Protocol (UDP) to a wireless access module (WLSM) 130. Note that although specific protocols, standards or other mechanisms are discussed similar functionality can be provided in other ways and still be suitable for use with the present invention. WLSM includes WDS control for communication with the L3MM using Link Control Protocol (LCP) over UDP. WDS processing includes registration of devices and handling maintenance events.

L3MM provides a WDS interface that uses L3M Communication Protocol (LCP) to exchange information with WDS. This protocol runs on top of a UDP connection between a route processor (RP) and the WLSM module. APs in the wireless network register themselves as well as their associated MNs with the WDS. APs use WLCCP messages to exchange information with WDS module. On getting information about an AP or a MN, WDS sends that information to L3MM using LCP messages. L3MM processes these messages and updates its mobility database. In addition to these, L3MM and WDS exchange periodic heartbeat messages to ensure health of the communication channel between them.

An L3MM Database Manager is used to maintain a mobility database including information about each MN and AP that are registered with the WDS for L3 mobility. A database entry includes the MAC and IP addresses for the MN, the AP IP address and a wireless network ID. An entry is kept for each MN and is indexed by MN's MAC address. Other designs can use any suitable format for data structures and different numbers and types of information.

The mobility database can be updated as a result of an update from WDS or as a result of an IOS event that changes one of the above attributes of the MN.

The L3MM Data-path Control is responsible for establishing data path between the MN and Central Switch for centralized data forwarding. This component also listens to various IOS events and updates the data path accordingly. Various functions of this component include maintaining multi-point GRE tunnels between the Cat6k and the APs; learning MN MAC to IP_ADDR binding via DHCP snooping; and relaying CS MAC address to AP, so that AP can proxy ARP with CS's MAC address when MN does an ARP.

GRE/mGRE tunnel communication is used to facilitate MN and AP communications with CS and L3MM. Although GRE encapsulation is used in a preferred embodiment, other encapsulation (e.g., Multi-Protocol Label Switching (MPLS), etc.), tunneling, relaying or other communication techniques may be used in other embodiments. A GRE encapsulated packet includes a delivery header in IPv4 format. The delivery header is followed by a GRE header and a payload packet that is the subject of the encapsulation.

Multipoint GRE (mGRE) is an implementation of the GRE protocol. By configuring MGRE tunnels, a multipoint tunnel network is created as an overlay to the IP backbone network. The mGRE tunnel source and destinations belong to a logical IP subnet. In a peer-to-peer (p2p) GRE tunnel, there is only one fixed destination corresponding to the tunnel interface and hence one encapsulation ("encap") adjacency is created per interface. In an mGRE tunnel, multiple destinations/endpoints are added to the tunnel dynamically. For each mGRE tunnel, an encap adjacency is used for each endpoint on the logical IP subnet which receives traffic from the router. Unlike a p2p tunnel in which an encap adjacency is already installed when the tunnel is setup, an mGRE tunnel does not have any encap adjacencies when the tunnel is initially up. A glean adjacency (i.e., an adjacency that forwards all packets whose destination address matches the interface subnet to the software) is installed for the least specific tunnel logical IP subnet prefix when the mGRE tunnel is up. Packets destined for the tunnel interface that hit this glean adjacency will be sent to RP and get dropped. Later when the tunnel endpoint is discovered, the corresponding adjacency can then be created.

In a preferred embodiment, the data traffic between AP and CS is encapsulated in IP/GRE tunnel. By configuring the mGRE tunnel on CS, the overlay interconnects CS and Mobile Nodes logically to allow data traffic to flow over in both directions. MNs are tunnel endpoints. APs are used as the tunnel entry and termination point for all MNs belongs to it. The same underlay transport address (AP's IP address) can be used to reach multiple different mGRE tunnel endpoints (MNs that belong to that AP).

Figure 2:
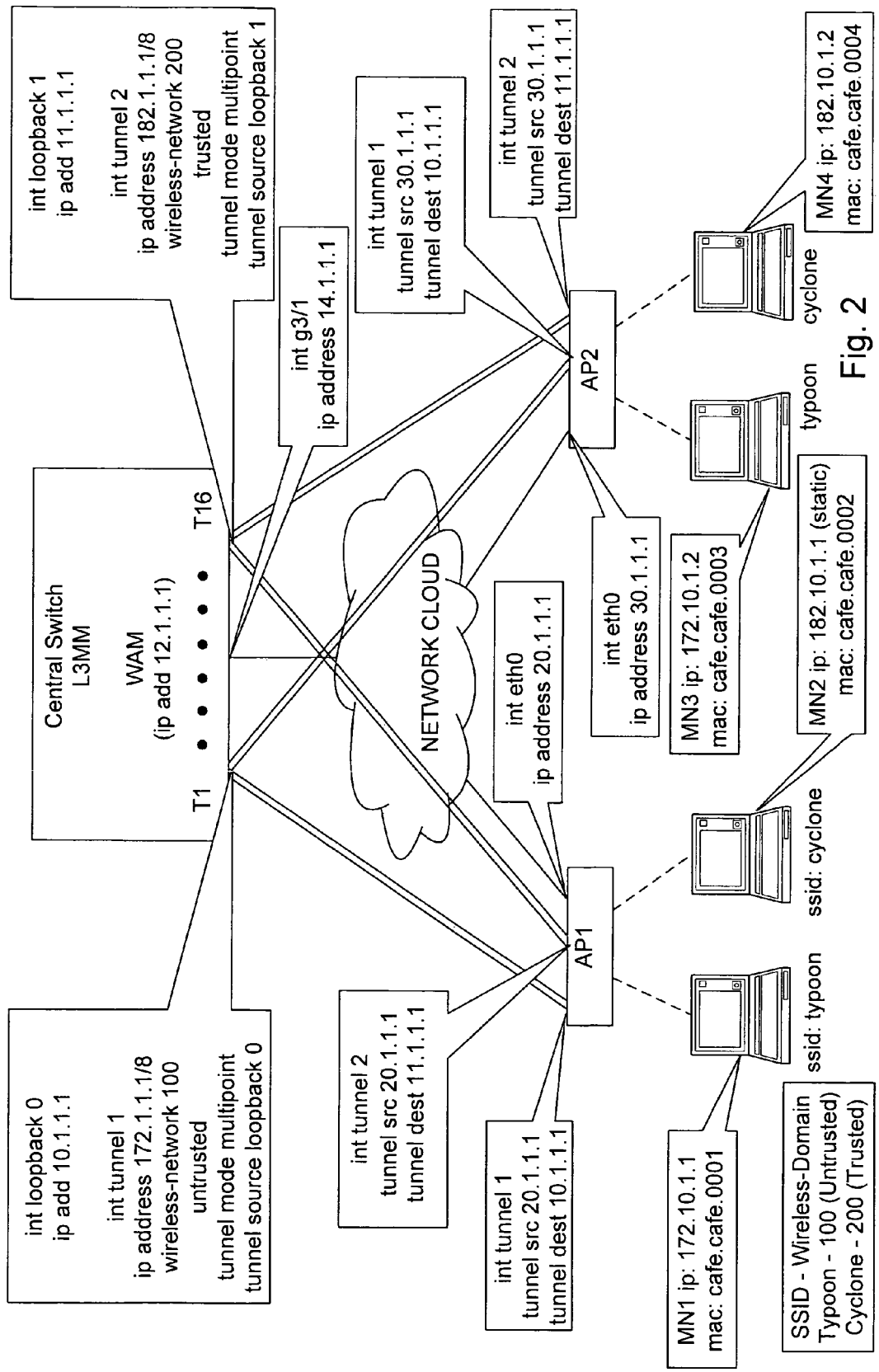
FIG. 2 shows a topology for a tunneling network according to an embodiment of the present invention.

For example, in FIG. 2, the same underlay AP1 address 20.1.1.1 is used for tunnel traffic to reach MN1 and MN2. On each AP, there can be a maximum of 16 p2p GRE tunnels to CS, and the (#APs * 16) p2p tunnel interfaces on the CS form 16 mGRE tunnel interfaces. Each mGRE tunnel defines a wireless network domain. Different set of features, Access Control Lists (ACLs) and QoS policies can be configured on individual mGRE tunnel interface and applied to MNs grouped by the wireless network domain.

FIG. 2 shows a topology for a tunneling network according to an embodiment of the present invention. In FIG. 2, two access points associated with mobile nodes MN1 and MN3 are endpoints of the mGRE tunnel (T1) with logical IP subnet 172.0.0.0/8. MN2 and MN4 are access points and endpoints of another mGRE tunnel (T16) with logical subnet 182.0.0.0/8.

When MNregisters with L3MM on CS, L3MM notifies tunnel code to create a tunnel endpoint. This will trigger a routing entry, such as one of the Cisco Express Forward (CEF) routing entry format, to be created for the MN IP address. If this is the first MN to the AP, an encap adjacency is created with IP_DA=APip, and IP_SA=Tunnel-src-ip. For egress traffic, all MNs (endpoints) belong to the same AP share one tunnel encap adjacency. For ingress traffic, it works the same as p2p GRE tunnel, i.e. all ingress traffic (from different endpoints) has one same decap adjacency for one mGRE tunnel.

APs are the actual GRE tunnel entry and termination points. When a GRE encapsulated packet reaches AP, AP strips off the outer IP and GRE header. The inner IP_DA tells AP which MN the packet should go. In a preferred embodiment, a Forwarding Information Base (FIB) control module retrieves tunnel information from a separate Inter-Process Communication (IPC) channel. Hardware adjacencies are created based on tunnel information and the tunnel source and destination are fixed. With multiple GRE support only the tunnel source is known from the configuration since tunnel destination/endpoints can be added or removed dynamically. In this case, the control module programs the hardware adjacencies for tunnel endpoints by listening to CEF adjacency updates.

Figure 3:
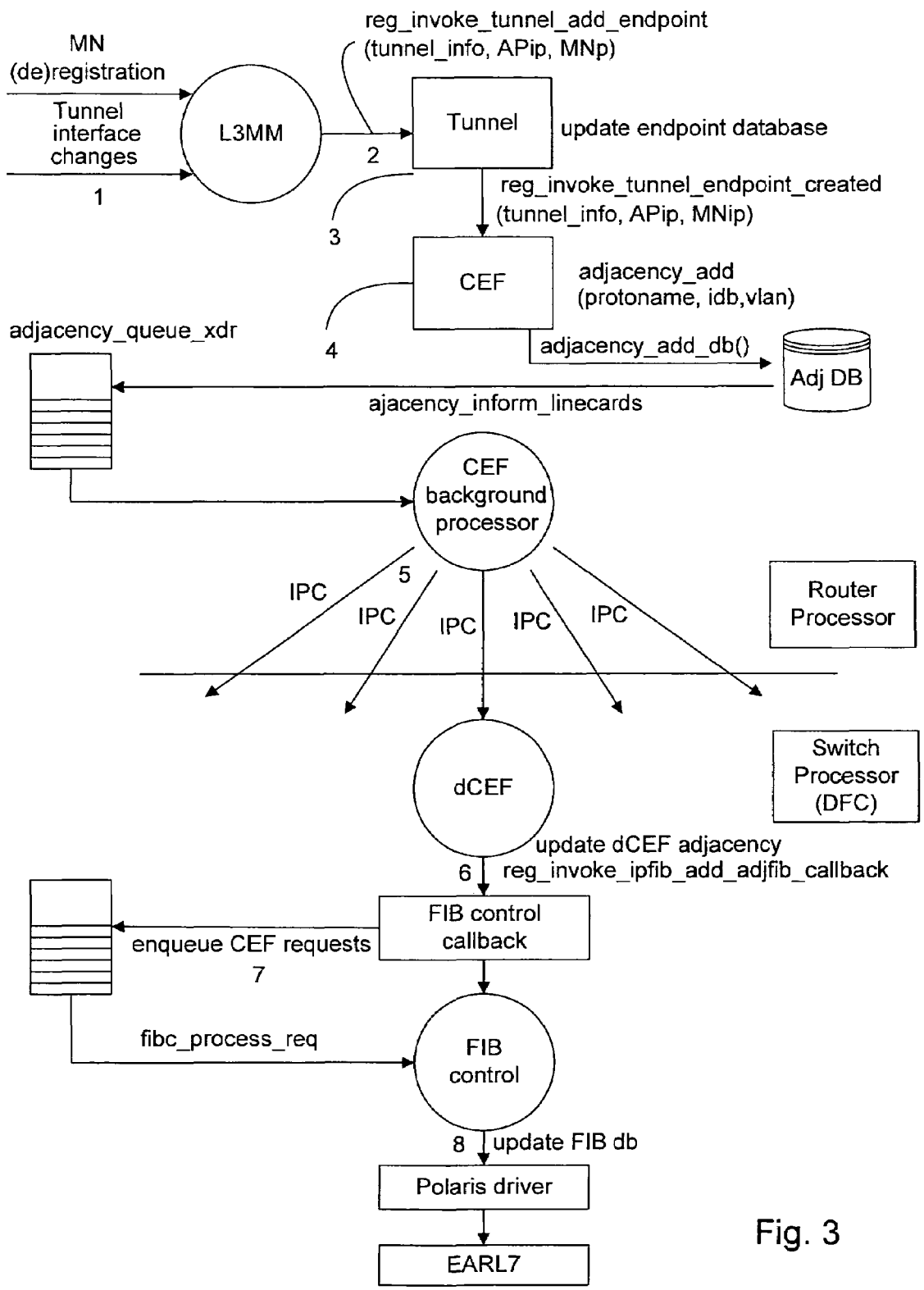
FIG. 3 gives an overview of how tunnel endpoint and encap adjacency is created and distributed.

FIG. 3 gives an overview of how tunnel endpoint and encap adjacency is created and distributed to the linecards when the L3MM receives a Mobile Node registration. In FIG. 3, at step 1 the L3MM receives an MN registration or deregistration request. At step 2, the L3MM learns IP address of MN via DHCP Snooping. Note that other mechanisms can be used in other embodiments to learn the MN IP address. At step 3, the L3MM updates its database and then notifies the tunnel module about the endpoint addition or deletion. It calls a routine to add or delete a tunnel endpoint. For adding a tunnel endpoint the routine is called with corresponding tunnel information such as identification, an AP IP address, and an MN IP address. Note that such an add or delete endpoint routine can be implemented in any suitable manner and can use different numbers or types of calling parameters.

At step 4, the tunnel module updates the endpoint database and informs CEF about the endpoint addition. At step 5, a CEF process gets the notification and creates or deletes the corresponding adjacency. It then calls a routine to update a linecard's adjacency and queues the adjacency update pending to send it down to the linecard(s). At step 6, the CEF background processor later distributes the adjacency update to DFC linecards and a Switch Processor (SP) via IPC messages. At step 7, dCEF on SP and DFC cards get the adjacency update and notifies appropriate processes. At step 8, a FIB control callback routine enqueues the CEF adjacency update requests. The request is later processed by a FIB control processor to update the FIB database.

The following paragraphs describe details of handling of events related to multipoint tunnel creation, deletion, modification and change of state. Although specific sequences and types of steps are provided these are merely examples and other ways of achieving the same functionality are possible, including use of different steps. Creation or deletion of tunnel interfaces can be through explicit user configuration or can be initiated automatically. Modification of tunnel interface attributes includes changes to (1) destination IP address; (2) source IP address; (3) wireless network ID; and (4) trusted/distrusted attribute. Tunnel change of up/down state can occur either by user direction or automatically as, for example, based upon a network event.

A sample configuration of a wireless tunnel interface is shown in Table I, below.

TABLE I

```
int tunnel 10
ip address 172.1.1.1 255.0.0.0
tunnel source loopback0
tunnel mode gre multimode
<mobility network-id 100>
<mobility trusted>
<mobility broadcast>
```

In Table I, configuration commands to make the tunnel wireless are in angle brackets. When the tunnel interface is configured to GRE multipoint, users are allowed to further configure the mobility features for the mGRE tunnel. When mobility network-id is configured, a sub-block is created and attached to the tunnel IDB. Any mobility configuration change triggers notification of the change to the L3MM. A preferred embodiment allows tunnels to be created and configured prior to actual use by, or assignment to, a user or mobile node.

Table II shows an example of an implementation of data structures to handle wireless mGRE configuration and communication.

TABLE II

```
typedef struct wireless_brl_data_t_ {
    ulong                    packet_counter;
    clock_epoch              packet_receive_time;
} wireless_brl_data;
/* mobility subblock */
typedef struct wireless_sw_sb_t_ {
    SWSB_BASE;
    int wireless_network_id;   /* wireless network id to identify */
                               /* the wirless subnet associated   */
                               /* with the mGRE tunnel            */
    uint flags;                /* flag to indicate wirless network*/
                               /* domain properties, e.g trust,   */
                               /* broadcast                       */
    wireless_brl_data *brl;    /* broadcast rate limit data       */
                               /* structure                       */
} wireless_sw_sb_t;
```

In a preferred embodiment, a user can add, delete or modify the configuration on a wireless mGRE tunnel interface. Even though changing the tunnel configuration in a running system can have undesirable consequences, such configuration changes are allowed and the effects of resulting unwanted states are minimized or are otherwise recoverable. For example, if a system administrator adds a new wireless mGRE tunnel interface the WDS on the wireless module sends periodic refresh messages to the L3MM and the reply to this message contains an association, or "binding," between a configured wireless network ID and tunnel endpoint IP. When a new wireless tunnel interface is added, L3MM updates its data structures and includes the new binding in the reply. Similar to session refreshes between L3MM and WDS, WDS and APs have a periodic re-registration message exchanged. This message includes a wireless tunnel binding TLV, or other message encoding for exchanging information between two or more devices. AP is expected to update with the new binding and start accepting Layer-3 Mobile clients on the new network.

Upon user deletion of a wireless tunnel interface the L3MM removes and updates the wireless network ID to tunnel IP bindings in its database. Updating typically occurs when the tunnel interface is deleted, when the absence of a wireless network ID is detected on a wireless tunnel interface, or when there is a change in tunnel source or the wireless network ID for an existing tunnel interface. The L3MM then informs mGRE to delete end points of the mobile nodes on that network, deletes all the mobile nodes on that network from the mobility database, invokes registries to notify the interested parties that the mobile nodes are getting de-registered, and updates WDS with the current mobility bindings.

When AP eventually learns the change in the bindings, AP is expected to disassociate all the MN on that wireless network. A tunnel endpoint IP can change by changing the tunnel source itself (use a different loopback) or by changing the IP address of the loopback that the tunnel is using. L3MM gets notified via a process to invoke the tunnel configuration change in the former case; and in the latter case the L3MM listens to a process to invoke the IP address change.

A wireless tunnel can be changed from a trusted to a distrusted connection and vice-versa. In a preferred embodiment, the L3MM applies this configuration change only for the new MNs, and does not take action on MNs that are already registered. When a wireless tunnel interface is changed from trusted to distrusted, the L3MM keeps the existing MN bindings, ignores MN IP addresses in an MN registration request, and starts listening to DHCP snooping requests. When an interface is changed from distrusted to trusted, the L3MM keeps the existing MN bindings, ignores MN binding updates from DHCP Snooping, and learns MN IP address from MN registration requests.

The IP address of a wireless tunnel dictates the IP subnet of all the MNs in that network. Any change to this IP address is considered very disruptive as all the MNs in that network may then be unreachable and it is up to an administrator to restore the network. From the route device's (i.e., central switch) perspective, these wireless tunnel interfaces can be considered as a layer-3 interface and any change in the IP address can trigger an update in forwarding tables (e.g., FIB/CEF tables) by virtue of the system's current behavior. L3MM listens to a process to invoke an IP address change to get notified when the IP address changes. In a preferred embodiment, the L3MM would then invalidate the IP addresses of all the MNs in the mobility database that belong to the tunnel/network that was affected. The L3MM assumes that FIB/CEF codes to listen to this event as well and delete the tunnel end points as the tunnel moved to a different subnet. Example pseudo code to cause the IP address change is shown in Table III.

TABLE III

```
reg_add_ip_address_change(13mm_ip_address_change,
                          "13mm_ip_address_change");
void
13mm_ip_address_change (idbtype, ipaddrtype, mask, boolean, boolean)
{
    for_each_mn_on_affected_wireless_tunnel {
        13mm_mdb_mn_update_ip(mn_mac, null_ip);
    }
}
```

Example pseudo code for a process to perform a configuration change is shown in Table IV.

TABLE IV

```
reg_add_tunnel_configuration_update(13mm_tunnel_configuration_updated,
                          "13mm_tunnel_configuration_updated");
void
13mm_tunnel_configuration_updated (tunnel_info *tinfo)
{
    for_each_wireless_tunnel(wtunnel) {
        if (tinfo->hwidb == wtunnel->hwidb) {
            if ((tinfo->src_ip != wtunnel->src_ip) ||
                (tinfo->wireless_id != wtunnel->wnid)) {
                update the bindings
                Send a message to L3MM process to invalidate
                all the MN on that network;
            } else {
                update the trusted flag
            }
        }
    }
    if (tunnel_not_found & (num_wireless_tunnels < MAX_WIRELESS_TUNNELS)) {
        add a new binding in the wireless_tunnel bindings data structure
    }
}
```

L3MM accepts MN registrations even when the tunnel is in a "down" state. However, the tunnel decap adjacencies are created only when the tunnel interface is up. Therefore traffic from MN is not routed. In this state, it is ok to accept all the MN and AP registrations and update the mobility database anticipating that the tunnel interface would come up.

When a tunnel interface comes up, L3MM does the following: In case there were already some MNs With mobility bindings established before tunnel went down, L3MM walks tiln the mobility database and adds each MN on this tunnel as a tunnel endpoint; in case there were MNs registered on this tunnel when it was down (e.g., mobility bindings are not complete yet as the MN's DHCP request would never have gotten through), L3MM adds them as tunnel end points when DHCP snooping notifies L3MM. The former case could be a time or data-intensive operation to add end points of all MNs and could hinder the normal operation of L3MM, if it is done in the L3MM process' context. Therefore a tunnel interface coming up event is fed to a different L3MM process for handling. However this approach could create inconsistencies as two processes could be adding endpoints for an MN not knowing that other process has already done it. To avoid such a situation, each MN in the database is tracked with an 'epoch' number. And the tunnel bindings data-struct also maintains an 'epoch'. In all cases tunnel epoch should be same as MN's epoch. Example pseudo code for handling a tunnel up event is shown in Table V.

TABLE V

```
reg_add_swif_coming_up(13mm_proc_tunnel_coming_up,
                      "13mm_proc_tunnel_coming_up");
void
13mm_proc_tunnel_coming_up (hwidb)
{
    13mm_wireless_tunnel_t *wtunnel;
    wtunnel = 13mm_wtunnel_get_wtunnel(hwidb);
    if (!wtunnel) return;
    post a message to L3MM Bulky Process
}
process
13mm_proc_hndl_tunnel_evt (void)
{
    for_all_mn_on_this_tunnel (mn) {
        /*
         * Tunnel could have gone down while
         * the process is processing up event.
```

TABLE V-continued

```
         * Install an Endpoint only when the tunnel is up,
         * else break from the loop
         */
        if (!tunnel_is_up) break;
        /*
         * MN doesn't have valid ip in the MN Database
         */
        if (!mn_with_valid_bindings)
            continue;
```

TABLE V-continued

```
/*
 * MN Epoch is same as tunnel's, no need to add the endpoint
 */
    if (mn->epoch == tunnel->epoch)
       continue;
       reg_invoke_tunnel_add_endpoint (mn->mn_ip, mn->ap_ip);
       mn->epoch = tunnel->epoch;
   }
}
```

For a tunnel interface going down event the L3MM does not remove the existing MN mobility bindings. L3MM accepts MN registrations even when the Tunnel is down. When the tunnel comes back up, the same information is used to establish connectivity to the MNs by adding them as tunnel endpoints. When L3MM is notified of a tunnel down event L3MM deletes all the end points on that tunnel. Table VI-shows an example in pseudo code for handling an interface going down.

TABLE VI

```
reg_add_swif_goingdown (l3mm_proc_tunnel_going_down,
                                 "l3mm_proc_tunnel_going_down");
void
l3mm_proc_tunnel_going_down (hwidb)
{
    if (!(wtunnel = l3mm_wtunnel_get_wtunnel(hwidb))) return;
    post a message to L3MM Bulky process
}
static void
l3mm_proc_hndl_tunnel_evt (hwidb)
{
    /*
     * Delete all the endpoint on this tunnel
     */
    for_all_mn_on_this_tunnel (mn) {
        reg_invoke_tunnel_delete_endpoint(mn->ip, ap->ip);
    }
}
```

Note that with the approach described above, it is not necessary for each AP to have explicit knowledge of other APs. In a preferred embodiment, client authentication is performed by an Authentication Authorization and Accounting (AAA) server and the authentication information is cached at a router or other layer-3 device so that a new AP will not have to communicate again with the AAA server if a previously authenticated MN appears at the new AP. By forcing client authentication before tunnel ingress and also maintaining authentication information caching for subsequent APs the act of an MN moving from one AP to another can be expedited and result in no noticeable pauses to a user. In cases where there may still be data lost due to authentication, optimization, such as that described herein, can be used to reduce the time for authentication and the resulting lost data. Note that other embodiments may provide a subset of the features described herein.

Although the invention has been discussed with respect to specific embodiments, these embodiments are merely descriptive, and not restrictive, of different features of the invention. For example, although reference is made to "layer 3" types of processing it should be apparent that features of the invention might reside in different of the Open Standards Interconnect (OSI)-defined layers such as layer 2, 4, etc. Further, the use of or reference to layers in the OSI standard may not be applicable to all implementations. In general, features of the invention can be used in concert with processes or devices that perform routing or directing of network traffic or information. Although specific protocols, data structures, orders of events, and other characteristics of network processing may be mentioned in general it is possible to use variations of these characteristics and still achieve the functionality included in the present invention.

Where a specific term is used to describe a device (e.g., AAA server) it should be apparent that other types of devices can be sufficient to provide similar, or a subset of, the functionality and still be within the scope of the invention. For example, an AAA, or any other type of authentication server need not be used where authentication is performed locally, or not at all.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a .specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for transferring information in a digital network, the method comprising
determining a tunnel configuration for a multipoint tunnel interface, the tunnel configuration used to generate a multipoint tunnel;
creating a multipoint tunnel using the tunnel configuration for the multipoint tunnel interface, the multipoint tunnel interface being an interface on a network device to transfer information from the from the network device to a plurality of endpoint devices through an access point;
using a routing configuration to route communications over the multipoint tunnel to the plurality of endpoint devices;
receiving a change to the tunnel configuration for the multipoint tunnel interface after creating the multipoint tunnel and routing communications over the multipoint tunnel to the plurality of endpoint devices, wherein changing comprises changing a wireless network ID identifying a subnet for the multipoint tunnel, IP address, and trusted/distrusted attribute indicating whether the multipoint tunnel is trusted or distrusted; and
managing state of the network such that the change of the tunnel configuration is allowed, wherein changing of the wireless network ID includes dynamically causing a change in a binding for the endpoint devices bound to the subnet identified by the wireless network ID for the access point and changing the trusted/distrusted attribute dynamically causing changing in behavior for how endpoint devices are bound to the access point, and changing the IP address dynamically causing deleting of bindings for the endpoint devices for the access point for the multipoint tunnel interface.

2. The method of claim 1, further comprising discovering a host, wherein the discovering causes the change to the tunnel configuration.

3. The method of claim 2, wherein the host includes a user device or an access point.

4. The method of claim 2, wherein changing includes adding a discovered host.

5. The method of claim 2, wherein changing includes removing a discovered host that has been added.

6. The method of claim 2, wherein changing includes changing a characteristic of the host.

7. The method of claim 6, wherein a characteristic includes an address for a physical location.

8. The method of claim 1, wherein the change to the tunnel configuration comprises a change to a source ID for the access point as a tunnel source of the multipoint tunnel after creating the multipoint tunnel and routing communications over the multipoint tunnel.

9. The method of claim 8, wherein the change to the routing configuration comprises updating a forwarding table for the plurality of endpoint devices.

10. The method of claim 9, wherein the updating comprises deleting entries for the plurality of endpoint nodes in the forwarding table such that communications are not sent through the multipoint tunnel interface for the plurality of endpoint nodes.

11. The method of claim 1, wherein the change to the tunnel configuration comprises changes to a destination ID for a device as a tunnel destination to the multipoint tunnel interface after creating the multipoint tunnel and routing communications over the multipoint tunnel.

12. The method of claim 1, wherein when the change of the distrusted/trusted attribute is to trusted, the method comprising dynamically causing ignoring of mobile node binding updates from snooping and learning mobile node IP addresses from mobile node registration requests.

13. The method of claim 12, wherein when the change of the distrusted/trusted attribute is to distrusted, the method comprising dynamically causing listening to mobile node binding updates from snooping and ignoring mobile node IP addresses from mobile node registration.

14. An apparatus for transferring information in a digital network, the apparatus comprising
means for determining a tunnel configuration for a multipoint tunnel interface, the tunnel configuration used to generate a multipoint tunnel;
means for creating a multipoint tunnel using the tunnel configuration for the multipoint tunnel interface, the multipoint tunnel interface being an interface on a network device to transfer information from the from the network device to a plurality of endpoint devices through an access point;
means for using a routing configuration to route communications over the multipoint tunnel to the plurality of endpoint devices;
means for receiving a change to the tunnel configuration for the multipoint tunnel interface after creating the multipoint tunnel and routing communications over the multipoint tunnel to the plurality of endpoint devices, wherein changing comprises changing a wireless network ID identifying a subnet for the multipoint tunnel, IP address, and trusted/distrusted attribute indicating whether the multi point tunnel is trusted or distrusted and
means for managing state of the network such that the change of the tunnel configuration is allowed, wherein changing of the wireless network ID includes dynamically causing a change in a binding for the endpoint devices bound to the subnet identified by the wireless network ID for the access point and changing the trusted/distrusted attribute dynamically causing changing in behavior for how end point devices are bound to the access point, and changing the IP address dynamically causing deleting of bindings for the endpoint devices for the access point for the multipoint tunnel interface.

15. An apparatus for transferring information in a digital network means for the apparatus comprising
a processor for executing instructions;
a machine-readable medium including;
one or more instructions for determining a tunnel configuration for a multipoint tunnel interface, the tunnel configuration used to generate a multipoint tunnel;
one or more instructions for creating a multipoint tunnel using the tunnel configuration for the multipoint tunnel interface, the multipoint tunnel interface being an interface on a network device to transfer information from the from the network device to a plurality of endpoint devices through an access point;

one or more instructions for using a routing configuration to route communications over the multipoint tunnel to the plurality of endpoint devices;

one or more instructions for receiving a change to the tunnel configuration for the multipoint tunnel interface after creating the multipoint tunnel and routing communications over the multipoint tunnel to the plurality of endpoint devices, wherein changing comprises changing a wireless network ID identifying a subnet for the multipoint tunnel, IP address, and trusted/distrusted attribute indicating whether the multipoint tunnel is trusted or distrusted; and one or more instructions for managing state of the network such that the change of the tunnel configuration is allowed, wherein changing of the wireless network ID includes dynamically causing a change in a binding for the endpoint devices bound to the subnet identified by the wireless network ID for the access point and changing the trusted/distrusted attribute dynamically causing changing in behavior for how endpoint devices are bound to the access point, and changing the IP address dynamically causing deleting of bindings for the endpoint devices for the access point for the multipoint tunnel interface.

16. A machine-readable medium including instructions for transferring information in a digital network, the machine-readable medium comprising one or more instructions for determining a tunnel configuration for a multipoint tunnel interface, the tunnel configuration used to generate a multipoint tunnel;

one or more instructions for creating a multipoint tunnel using the tunnel configuration for the multipoint tunnel interface, the multipoint tunnel interface being an interface on a network device to transfer information from the from the network device to a plurality of endpoint devices through an access point;

one or more instructions for using a routing configuration to route communications over the multipoint tunnel to the plurality of endpoint devices;

one or more instructions for receiving a change to the tunnel configuration for the multipoint tunnel interface after creating the multipoint tunnel and routing communications over the multipoint tunnel to the plurality of endpoint devices, wherein changing comprises changing a wireless network ID identifying a subnet for the multipoint tunnel, IP address, and trusted/distrusted attribute indicating whether the multipoint tunnel is trusted or distrusted; and one or more instructions for managing state of the network such that the change of the tunnel configuration is allowed, wherein changing of the wireless network ID includes dynamically causing a change in a binding for the endpoint devices bound to the subnet identified by the wireless network ID for the access point and changing the trusted/distrusted attribute dynamically causing changing in behavior for how endpoint devices are bound to the access point, and changing the IP address dynamically causing deleting of bindings for the endpoint devices for the access point for the multipoint tunnel interface.

17. A method for transferring information in a digital network, wherein the digital network includes a plurality of mobile nodes and a network device, the method comprising configuring at least a subset of the plurality of mobile nodes on a first tunnel interface;

associating a policy with the first tunnel interface that applies to the at least a subset of the plurality of mobile nodes;

creating a tunnel to transfer communications between the at least a subset of the plurality of nodes using the first tunnel interface according to the policy;

routing communications over the tunnel to the at least a subset of the plurality of nodes;

determining an event associated with a change to the first tunnel interface that satisfies a criterion that necessitates a change in managing state among the at least a subset of the plurality of mobile nodes after creating the tunnel and routing the communications, wherein the event comprises changing a wireless network ID identifying a subnet for the multipoint tunnel, IP address, and trusted/distrusted attribute indicating whether the multipoint tunnel is trusted or distrusted; and managing, using the network device, state of the network such that the change of the tunnel configuration is allowed, wherein changing of the wireless network ID includes dynamically causing a change in a binding for the endpoint devices bound to the subnet identified by the wireless network ID for the access point and changing the trusted/distrusted attribute dynamically causing changing in behavior for how endpoint devices are bound to the access point, and changing the IP address dynamically causing deleting of bindings among the at least a subset of the plurality of mobile nodes for the access pointing.

18. The method of claim 17, wherein the policy includes quality of service factors.

19. The method of claim 17, wherein the policy includes an access control list.

20. The method of claim 17, wherein the criterion includes a creation of a multipoint interface.

21. The method of claim 17, wherein the criterion includes a deletion of the tunnel interface.

22. The method of claim 17, wherein the criterion includes a modification of a tunnel attribute.

23. The method of claim 17, wherein the criterion includes a change in a tunnel state.

24. A method for communicating in a mobile network, the method comprising:

creating a plurality of tunnels in a mobile network, wherein each tunnel has a predefined attribute;

assigning at least one of the created plurality of tunnels to a mobile device; and using the assigned tunnel to communicate with the mobile device using a routing configuration to route communications over the tunnel to mobile device;

changing a tunnel configuration for a tunnel interface after creating the tunnel and routing communications over the tunnel to the mobile device, the tunnel interface being an interface on a network device to transfer information from the network device to the mobile device through an access point, wherein changing comprises changing a wireless network ID identifying a subnet for the multipoint tunnel, IP address, and trusted/distrusted attribute indicating whether the multipoint tunnel is trusted or distrusted; and managing, using the network device, state of the network such that the change of the tunnel configuration is allowed, wherein changing of the wireless network ID includes dynamically causing a change in a binding for the endpoint devices bound to the subnet identified by the wireless network ID for the access point and changing the trusted/distrusted attribute dynamically causing changing in behavior for how endpoint devices are bound to the access point, and changing the IP address dynamically causing deleting of bindings among the at least a subset of the plurality of mobile nodes for the access point.

25. The method of claim 24, wherein the plurality of tunnels comprise a multipoint tunneling system.

26. The method of claim 24, wherein the predefined attribute includes policy information.

27. The method of claim 26, wherein the policy information includes access control.

28. The method of claim 26, wherein the policy information includes quality of service.

29. The method of claim 26, wherein the policy information includes network address translation information.

30. The method of claim 26, wherein the policy information includes policy-based routing information.

31. The method of claim 24, wherein the assigned tunnel includes an endpoint, wherein the mobile device is associated with an access point, wherein the access point is associated with the endpoint.

32. The method of claim 24, wherein the predefined attribute includes an internet protocol address.

33. The method of claim 24, wherein the predefined attribute includes tunnel encapsulation information.

34. The method of claim 24, wherein the predefined attribute includes security information.

* * * * *

UNITED STATES PATENT AND TRADEMARK OFFICE
CERTIFICATE OF CORRECTION

PATENT NO.        : 7,616,613 B2                                              Page 1 of 1
APPLICATION NO.   : 10/992943
DATED             : November 10, 2009
INVENTOR(S)       : Sanzgiri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 955 days.

Signed and Sealed this

Nineteenth Day of October, 2010

David J. Kappos
*Director of the United States Patent and Trademark Office*